Patented Oct. 27, 1925.

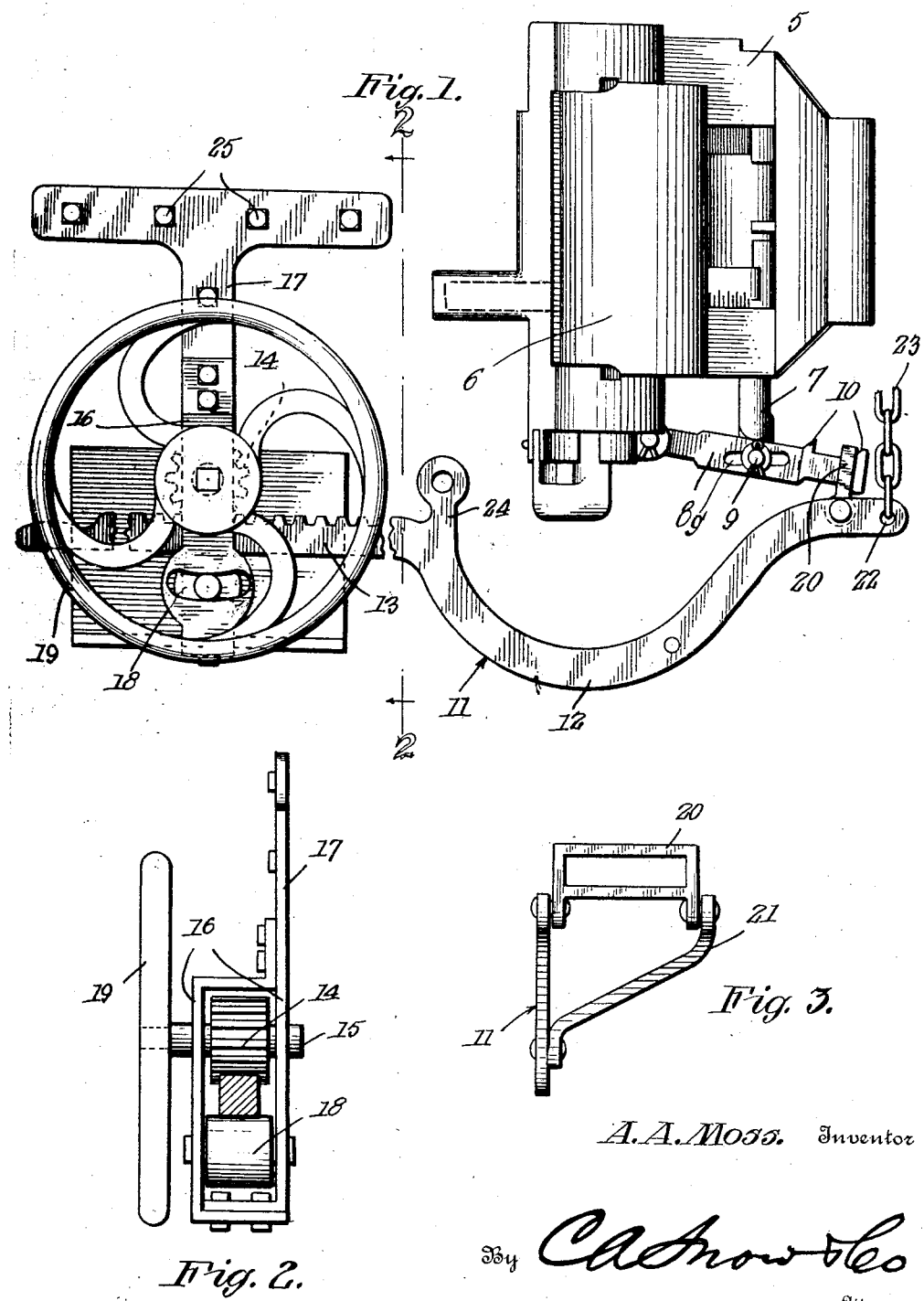

1,558,747

UNITED STATES PATENT OFFICE.

ALBERT AUGUSTUS MOSS, OF NEWARK, NEW JERSEY.

CAR COUPLING.

Application filed June 25, 1924. Serial No. 722,347.

*To all whom it may concern:*

Be it known that I, ALBERT AUGUSTUS MOSS, a citizen of the United States, residing at Newark, in the county of Essex and State of New Jersey, have invented a new and useful Car Coupling, of which the following is a specification.

This invention relates to an operating mechanism especially designed for use in connection with car couplings and more particularly a car coupling of a construction as shown and described in my application Serial Number 563,468, filed May 25, 1922.

An important object of the invention is to provide means whereby the vertically movable jaw operating bar of a car coupler as shown in my pending application may be operated from a point remote from the coupler to insure against the operator being injured, during the coupling or uncoupling of the coupler.

Another object of the invention is to provide means for operating the vertically movable operating bar with the minimum amount of exertion on the part of the operator.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a front elevational view of a car coupler disclosing an operating mechanism constructed in accordance with the invention.

Figure 2 is a sectional view taken on line 2—2 of Figure 1.

Figure 3 is an end elevational view disclosing the connection between the operating lever and bar of the coupler.

Referring to the drawing in detail, the reference character 5 indicates the body portion of a coupler that supports the movable jaw 6 which is controlled by the movement of the vertically movable bar 7 forming a part of the coupler structure, the operation thereof being clearly set forth in my pending application.

The controlling arm of the coupler is indicated at 8 and has connection with the bar 7 by means of the bolt 9 that extends through the elongated opening 9′ formed in the bar 8, the outer end of the controlling arm being formed with lugs 10.

The operating mechanism forming the essence of the invention includes an arm 11 curved as at 12 and provided with a relatively straight portion 13 formed with teeth disposed along the upper edge thereof, to be engaged by the pinion 14 mounted on the shaft 15 disposed in suitable bearings formed in the bars 16 of the supporting bracket 17.

Disposed under the portion 13 of the arm 11 is a roller 18 which acts as a support for the arm 13 to permit the arm 11 to be operated with the minimum amount of exertion on the part of the operator. The reference character 19 indicates the operating wheel which is mounted on one end of the shaft 15 which is grasped by the operator to rotate the shaft 15 and pinion 14.

Pivotally supported at the outer end of the arm 11 is an elongated link 20 which is adapted to fit over the outer end of the operating arm 8, the lugs 10 acting to hold the link to the arm 8. As clearly shown by Figure 3 of the drawings, the link 20 is pivotally supported between one end of the arm 11 and the laterally disposed arm 21 in such a way that the link will swing when operated to move the bar 7 vertically.

An opening 22 is provided in the arm 11 at a point adjacent to the outer end thereof and is designed to accommodate one of the links of the chain 23 that has its upper end terminating at a point in proximity to the roof of the car so that the arm 11 may be operated from a point above the coupling, eliminating the necessity of the operator if he should be on the roof of the car, moving to a position to operate the arm by the wheel 19.

Formed integral with the arm 11 is an upwardly extended lug 24 formed with an opening to receive one end of the chain not shown, so that should it be desired to connect a chain to the arm 11 for operating the arm, at this point so that the upper end of the chain may be conveniently supported at the roof of the car, such operation may be accomplished.

It might be further stated that the supporting bracket is supplied with suitable openings to accommodate the bolts 25 so that the bracket member together with the gears and members supported thereby may be secured to the end of a car.

In the use of the device, it will be obvious that when the wheel 19 is rotated, the arm 11 will be moved laterally and upwardly, to the end that the bar 7 is moved upwardly to accomplish its purpose. When the wheel 19 is rotated in the opposite direction, it will be obvious that the arm 11 will move in the reverse direction to move the bar 7 to the limit of its downward movement.

I claim:—

The combination with a car coupler having a vertically movable operating bar of an operating mechanism including a supporting bracket, said supporting bracket including spaced bars, said spaced bars having elongated curved openings, a roller mounted within the openings, a laterally movable arm having teeth formed along the upper edge thereof and resting on the roller, and a pinion mounted between the spaced bars and cooperating with the teeth of the laterally movable arm to move the laterally movable arm, and means for connecting the arm to the coupler to operate the vertically movable operating bar.

In testimony that I claim the foregoing as my own, I have hereto affixed my signature.

ALBERT AUGUSTUS MOSS.